United States Patent [19]

Brandenburg et al.

[11] 3,742,144

[45] June 26, 1973

[54] INTERCONNECTED LOOP DIGITAL TRANSMISSION SYSTEM

[75] Inventors: Lane Howard Brandenburg, New York, N.Y.; Bhaskarpillai Gopinath, Chatham, N.J.; Robert Paul Kurshan, New York, N.Y.

[73] Assignee: Bell Telephone Laboratories, Incorporated, Murray Hill, N.J.

[22] Filed: Nov. 24, 1971

[21] Appl. No.: 201,744

[52] U.S. Cl. .......... 179/15 AL, 340/146.2

[51] Int. Cl. .......... H04j 3/08

[58] Field of Search .......... 179/15 AL; 340/146.2, 172.5

[56] References Cited

UNITED STATES PATENTS

| | | | |
|---|---|---|---|
| 3,656,109 | 4/1972 | Conway | 340/146.1 A |
| 3,137,839 | 6/1964 | Rubin | 340/146.2 |
| 3,350,685 | 10/1967 | Lindaman | 340/146.2 |
| 3,336,468 | 8/1967 | Lindaman | 340/146.2 |

*Primary Examiner*—Kathleen H. Claffy
*Assistant Examiner*—David L. Stewart
*Attorney*—W. L. Keefanner et al.

[57] ABSTRACT

A digital communication loop system wherein transfers of signal message blocks between interconnecting loops are only made when a Hamming distance criterion is satisfied. Appended to each message block is a loop destination address code comprised of a first ordered concatenation of two binary sequences. Stored at each interconnecting loop transfer point is an address code identifying one of said interconnecting loops, comprised of a second ordered concatenation of two binary sequences. The product of the first and second ordered codes is formed to determine the Hamming distance between the loop destination address code and the address code identifying the interconnecting loop.

10 Claims, 10 Drawing Figures

INTERCONNECTED LOOP DIGITAL TRANSMISSION SYSTEM

FIELD OF THE INVENTION

This invention pertains to digital transmission systems and, more particularly, to a digital transmission system wherein a plurality of transmission loops are interconnected by switching stations which respond to address information, positioned within each data message block, to selectively switch the message block to an interconnected loop.

BACKGROUND OF THE INVENTION

If digital information is to be exchanged between terminals separated by any substantial distance, it is generally necessary to use dedicated transmission facilities between such terminals, or to temporarily connect such terminals by common carrier, switched transmission facilities. Since it is the nature of digital data sources to require large amounts of digital channel capacity for relatively brief and unexpected periods, i.e., digital information is characterized as being "bursty," such facilities have often proven unsatisfactory.

Dedicated transmission facilities, for example, remain unused the vast majority of the time. With switched facilities, on the other hand, it often takes more time to set up the transmission path between terminals than is required for the transmission of the data message. Digital transmission of data need not be done in real time and hence it is wasteful to set up an entire connection prior to transmission. These facts tend to make some presently available transmission facilities uneconomical for digital communications.

In the copending application of J. R. Pierce, Ser. No. 79,185, entitled Data Block Transmission System, filed Oct. 8, 1970, (Case 97) an interconnected closed loop transmission system is described in which a plurality of stations have access to each loop to write messages into and read messages from standardized data message blocks transmitted around the loop. One station in each loop provides for regeneration of all message blocks. The various loops are interconnected by switching stations which respond to address information, conveniently located at the head or beginning of each message block, to selectively switch the block to an interconnected loop. This is accomplished by detecting address information, i.e., a destination code, and switching the message block to an interconnecting loop when the code indicates a destination on a loop different from the one on which the message block is currently circulating. This reliance on a difference criterion as the basis for a switching interconnection, though eminently suitable in many applications, is highly inefficient in many others. Ideally, a message block should transverse a minimum number of loops in its journey between a data source and a predestined data receiver.

In the copending application of R. L. Graham and H. O. Pollak, Ser. No. 119,724, filed Mar. 1, 1971 now U.S. Pat. No. 3,710,026, issued Jan. 9, 1973 and entitled "Interconnected Loop Digital Transmission System" (Case 2-1), each loop is designated with a predetermined $n$-bit address. A decision to switch from one loop to another interconnecting loop is made when the Hamming distance between the interconnecting loop address and the final destination loop address is less than the Hamming distance between the loop address in which the message block currently resides and the final destination loop address. Colloquially, an exit is made from one loop to another if and only if it decreases the Hamming distance between where you are and where you want to go. In a particular embodiment, the number of loops traversed is exactly equal to the Hamming distance between source and receiver loops, with each transfer between interconnecting loops decreasing said distance by one. Though such a system minimizes the number of loops which must be traversed by a message block in its journey between a data source and a predestined data receiver, it requires the use of a three-level code, i.e., the binary symbols 0 and 1 and a third dummy symbol, illustratively, "d," which indicates a "don't care" situation. Unfortunately, reliance on a three-level code requires complex logic apparatus to decipher the destination of a message block from its address code.

It is an object of the present invention to provide improved digital transmission facilities for communication between digital facilities using relatively simple logic apparatus.

It is a more specific object of the present invention to improve the efficiency and economy of digital transmission in an interconnecting loop transmission system.

It is another object of this invention to selectively address each loop in a transmission system utilizing only a two-level binary code to designate the loops.

SUMMARY OF THE INVENTION

These and other objects of this invention are achieved by using two ordered binary sequences in place of each loop address used in the abovementioned Graham-Pollak system. A message block addressed to loop $i$ is prefixed with the concatenated binary sequences $(a_i, b_i)$. At the interconnection of a loop $j$ and a loop $k$, there is stored the concatenated binary sequences $(b_j, a_j)$ and $(b_k, a_k)$ corresponding to the addresses respectively for loop $j$ and loop $k$. The distance between loops $i$ and $j$ or loops $i$ and $k$ is the simple scalar product of the two respective sequences. Thus, an AND gate cascaded with a conventional counter may be used to develop a scalar product signal proportional to the Hamming distance between the various loops.

DETAILED DESCRIPTION OF THE INVENTION

Figure 1:
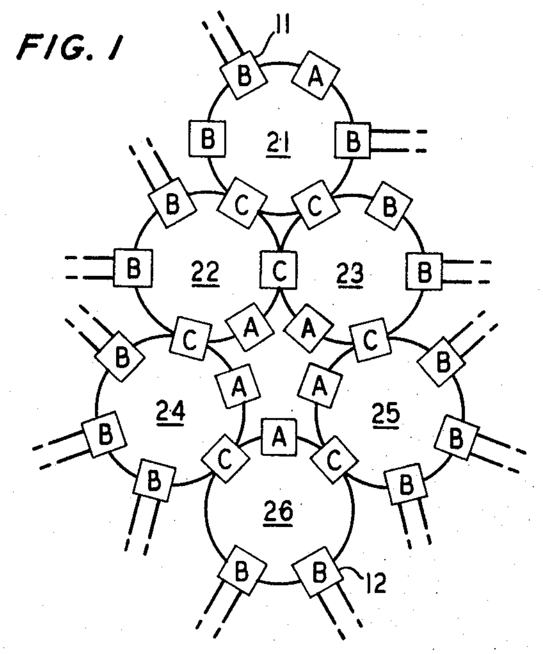
FIG. 1 depicts a general loop communication system.

FIG. 1 represents an intersecting loop data transmission system. Loop 21, e.g., interconnects a plurality of loops, 22 and 23. Loops 22 and 23, each interconnect, one with the other, and also respectively interconnect with loops 24 and 25. Loops 24 and 25, in turn, interconnect with loop 26. The digital transmission system of FIG. 1 thus comprises a plurality of closed transmission loops which intersect at selected points to permit the transfer of digital messages between the loops.

Three basic digital components are shown in FIG. 1 in addition to the transmission loops themselves. A unit, labeled as station "A," is provided for closing each loop. The A-stations also serve to provide synchronization and timing for their associated loops. Data stations, called "B-stations," are provided on all of the loops to permit access by data sources and/or data receivers. Any number of B-stations can be included on each loop. An interconnecting unit, called a "C-station," is placed at the intersections of the loops to allow transfers of data between the loops.

The network of FIG. 1 is only illustrative of the many types of data network loop configurations. The geographical extent of each loop and the number of access, "B," stations on each loop depends upon the information capacity of the associated loop and the loading provided by each access station. Thus, the various loops may have different channel capacities. Moreover, transmission on different loops need not be synchronous with one another; thus, the speed of transmission on different loops can vary.

In operation, data to be transmitted by the system is inserted on a loop at one of the B-stations in a standard length message block format that has associated with it an appropriate encoded destination address. This message block traverses its local loop until a C-station is reached in which a loop transfer may take place in order to deliver the message block to the designated address. If the destination is on the local loop, of course, the message will be delivered to that destination without ever leaving the local loop.

In transferring blocks of information from one loop to another, buffering is provided at the C-stations to take care of any differences in bit rates or timing. This buffer must be of an appropriate size to prevent excessive message blocking due to buffer overload. A more detailed description of the operation of a data loop network system and the apparatus which it includes may be found in the aforementioned copending application of J. R. Pierce.

Consider, e.g., a message which enters the system at B-station 11 and has as its destination a data receiver connected to B-station 12. The addresses of station 12, loop 26, and the source 11 and loop 21 addresses are included in the message block. It is desired that the message block thread its way through the various loops so as to minimize the total path length traversed and thereby effectuate faster transmission of data. If one known criterion for switching between loops is utilized, whenever an interconnecting loop has an address different than that of the current loop address, the data message block is transferred to the interconnecting loop. By no means does this insure that an optimal path will be traversed. Of course, in a simple system such as illustrated in FIG. 1, one may readily deduce the desired path for the message block. However, typical network configurations, it may be appreciated, are far more complex.

In the aforementioned application of Graham and Pollak, it is insured that optimal paths are traversed by requiring that a predetermined parameter, i.e., the Hamming distance, be reduced as a necessary condition to the switching of a message block from one loop to another. The Hamming distance is defined as the number of places in which two $n$-place binary numbers differ. Thus, e.g., the Hamming distance between 011 and 100 is three, between 10 and 11 is one, and between 1011 and 1000 is two. But such a criterion is meaningless unless the loops are identified with proper binary addresses. Graham and Pollak disclosed a method for assigning addresses to the loops of an arbitrary network such that each transfer between one loop and another, in accordance with the stated criterion, not only reduces the Hamming distance but also decreases said distance by exactly one.

Figure 2A:
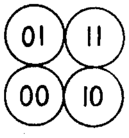
FIG. 2A depicts, abstractly, a communication loop system.
Figure 2B:
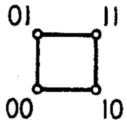
FIG. 2B depicts the graph of the loop system of FIG. 2A.

The loop system of FIG. 2A, which is abstractly depicted, illustrates the above-mentioned considerations. Of course, "C" stations would be present at each intersection and "A" and "B" stations would be used in each loop. Each loop is assigned a two-digit code ij, $i$, $j$ = 0 or 1. Routing in accordance with the stated criterion is accomplished by entering a new loop if the Hamming distance between where the message block is and its destination is decreased. If the Hamming distance is not decreased, no transfer is made. Thus, if it is desired to go from loop 10 to loop 11, the total Hamming distance is 1. The transfer from loop 10 to loop 00 is not effected since this does not decrease the Hamming distance. However, the message block circulating in loop 10 will exit into loop 11 when their mutual interconnection is reached. To go from loop 10 to loop 01, either exit, i.e., to loop 00 or to loop 11, decreases the total Hamming distance, from two to one, and is therefore acceptable. Thus, alternative routing along optimal paths is accomplished; if one C-station is busy, another may be used. However, the assignment of proper binary addresses to loops of a system is not obvious. A collection of loops of a system may be considered as a graph, with each loop a vertex of the graph, and two vertices connected if, and only if, the two loops have a mutual transfer point, i.e., an interconnection. The graph of the loop system of FIG. 2A is shown in FIG. 2B; the graph G of any closed loop system is necessarily a connected graph. Each vertex is identified by a sequence of digits, corresponding to its respective loop, and, because of the addressing scheme used, adjacent vertices differ in exactly one binary position. The number of edges of the graph required to traverse in passing from one vertex or loop to another is exactly the Hamming distance between the corresponding addresses, and the shortest path between two loops or vertices is achieved by following a route of decreasing Hamming distance to the desired destination.

Figure 3A:
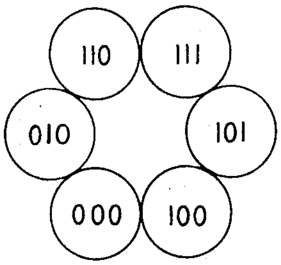
FIGS. 3A and 3B depict, abstractly, different communication loop systems.
Figure 3B:
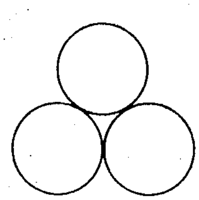

That the addressing of loops cannot be arbitrary is indicated by the system of six arbitrarily addressed loops of FIG. 3A. The Hamming distance, e.g., between loops 100 and 110, is one; however, the number of intersections traversed in going from 100 to 110 is three, contrary to the desired routing criterion. Problems also arise when an odd number of loops, such as shown in FIG. 3B, must be addressed. Available two-tuple addresses are 00, 10, 11, and 01. The assignment of any three combinations of these addresses to the loops of FIG. 3B will always result in a pair of addresses which differ by a Hamming distance of two. Yet, it is clear that to go from any one loop to another, only one interconnection need be traversed.

To overcome this problem, a third symbol is introduced by Graham and Pollak, e.g., "d," which does not contribute to the computation of the Hamming distance. Thus, in the case of FIG. 3B, the loops may be addressed as 00, 10, and d1, each differing one from the other by a Hamming distance of one since $d$ contributes zero to the computation. As another example, the Hamming distance, as defined, between 01d1d0 and 11d010 is two, with the contributions coming from the first and fourth binary positions. Of course, by definition, there is no binary bit corresponding to "d." Thus, addressed of the type described are realized, e.g., by encoding 0 as 00, 1 as 01, and $d$ as either 10 or 11. This reliance on a three-level code, i.e., 0, 1, or $d$ requires relatively complicated logic circuitry to determine the desired Hamming distance.

Our invention, on the other hand, is strictly a two-level code, and therefore lends itself to simple determination of the Hamming distance. More particularly, each destination address code, $h_i$, comprising 0's, 1's and $d$'s is reformulated, in accordance with our invention, to derive two binary sequences $a_i$ and $b_i$. Sequence $a_i$ has 1's wherever $h_i$ has 1's and has 0's elsewhere, i.e., the 0's and $d$'s, if any, of $h_i$ are replaced by 0's. Conversely, sequence $b_i$ has 1's wherever $h_i$ has 0's and has 0's elsewhere. Thus, if the address code $h_i$ is 01d1d0, then $a_i$ is 010100 and $b_i$ is 100001. A message block addressed to loop $i$ is prefixed with a first, ordered concantenated concatenated $(a_i, b_i)$ where $a_i$ and $b_i$ are derived from loop destination address code $h_i$. Thus, using the above example, if $h_i$ is 01d1d0, then $(a_i, b_i)$ is 010100100001. At each loop transfer point, i.e., at the "C" stations, there are stored two binary sequences identifying the immediate interconnecting loops. Assuming, e.g., that the address of one of the interconnecting loops is $h_j$, then there is stored a second, ordered concatenated sequence $(b_j, a_j)$ where binary sequences $b_j$ and $a_j$ are derived from $h_j$, as above, but appear in reverse order. E.g., if $h_j$ is 11d010, then $a_j$ is 110010, $b_j$ is 000101, and $(b_j, a_j)$ is 000101110010. The Hamming distance $D_{ij}$ between loop $i$ and $j$ is simply the scalar product between the two ordered concatenated sequences, i.e., $$D_{ij} = [a_i, b_i] \begin{bmatrix} b_j \\ a_j \end{bmatrix}$$

or $$D_{ij} = \sum_{k=1}^{n} a_{ik} b_{jk} + b_{ik} a_{jk} .$$

Thus, for the particular example discussed $$D_{ij} = \Big[\overbrace{010100}^{a_i}\ \overbrace{100001}^{b_i}\Big] \left[\begin{matrix} \left.\begin{matrix}0\\0\\0\\1\\0\\1\end{matrix}\right\} b_j \\ \\ \left.\begin{matrix}1\\1\\0\\0\\1\\0\end{matrix}\right\} a_i \end{matrix}\right] = 2$$

More generally, we may define the elements of $a_i$ as $a_{i1}$, $a_{i2}, \ldots a_{in}$, and the elements of $b_i$ as $b_{i1}, b_{i2}, \ldots b_{in}$ for each loop address $h_i$, and also defined two matrices:

$$A = \begin{bmatrix} a_{11} & \cdots & a_{1n} \\ a_{21} & & \\ \cdot & & \cdot \\ \cdot & & \cdot \\ \cdot & & \cdot \\ a_{m1} & \cdots & a_{mn} \end{bmatrix} \qquad B = \begin{bmatrix} b_{11} & \cdots & b_{1n} \\ b_{21} & & \\ \cdot & & \cdot \\ \cdot & & \cdot \\ \cdot & & \cdot \\ b_{m1} & \cdots & b_{mn} \end{bmatrix}$$

where $m$ is the number of loops (vertices) in the system (graph). The distance between two loops $i$ and $j$ is then:

$$D_{ij} = \sum_{k=1}^{n} A_i (B_j)^t + B_i (A_j)^t ,$$

where the symbol "$t$" indicates the transpose of the identified row of matrix A or B. It will be apparent that the above method or algorithm of code reformulation is readily programmable by a programmer of ordinary skill in the art. Before further discussing the detailed implementation of our invention, it may be advantageous to first consider the apparatus of a typical loop system.

Figure 4:
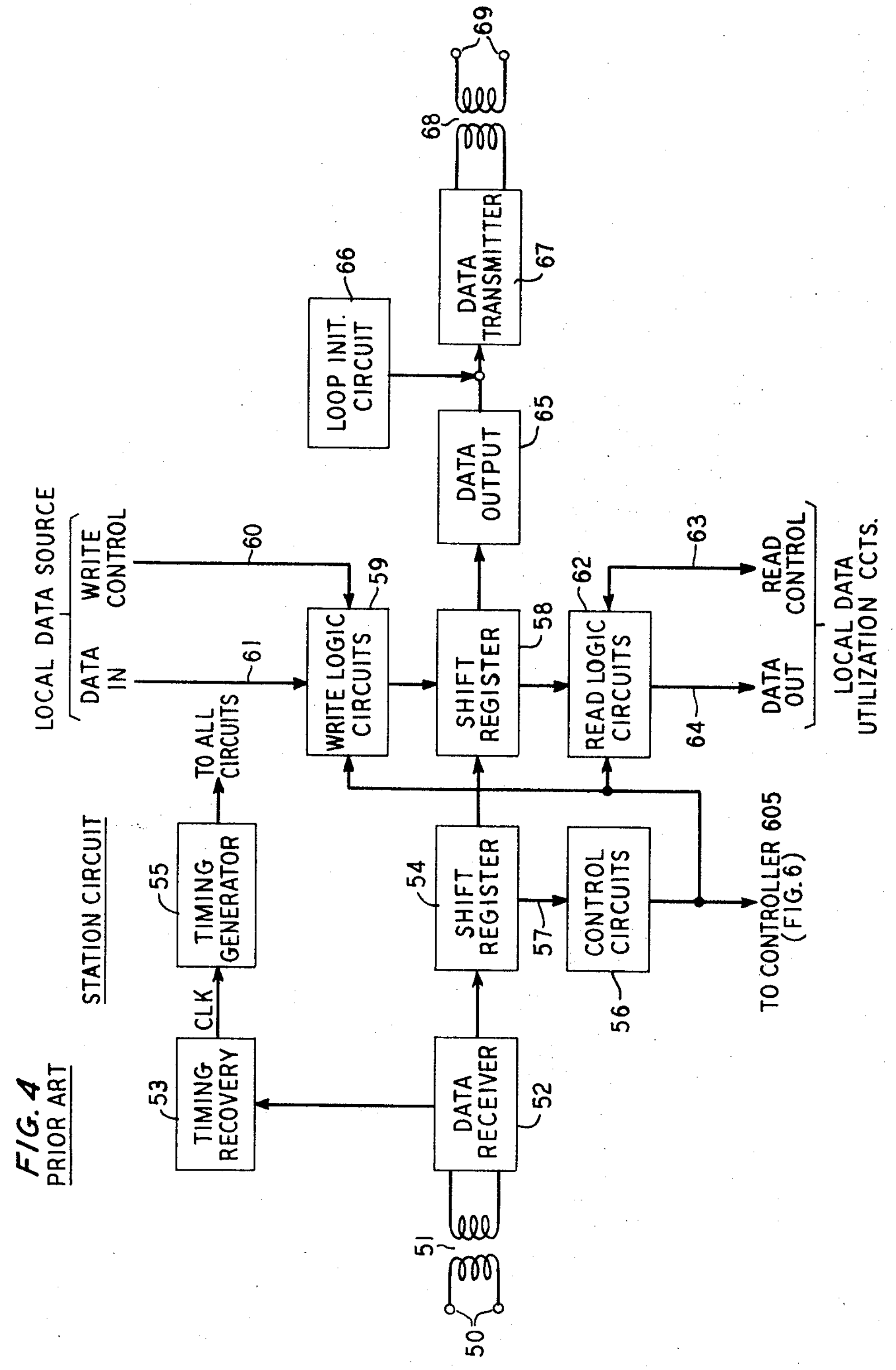
FIG. 4 PRIOR ART
FIG. 4 is a block diagram of an "A" or "B" station circuit used in the practice of this invention.

As mentioned above, a predetermined word of each data message block comprises a loop destination code indicating the loop destination to which the message block is to be delivered. For illustrative purposes, an eight-bit code or word is reserved for this loop destination code. Of course, two or more words may be used for this purpose. As described in the above-cited Pierce application, FIG. 4 depicts a station circuit useful as an "A" or "B" station in the communication system of FIg. 1. Digital message blocks including a loop destination code, traversing a loop, appear at input terminals 50 and are applied via isolating transformer 51 to data receiver 52. Data receiver 52 demodulates the received signals and applies the demodulated signals to timing recovery circuit 53 and shift register 54.

Timing recovery circuit 53 utilizes the pulse repetitions of the message block to synchronize a local clock. The clock pulses thus developed are supplied to timing generator circuit 55 which provides the timing pulses required to synchronize the operations of the balance of the station circuit.

Shift register 54 is a serial input, serial output, nine-bit shift register having parallel access to all of the register stages for reading purposes. Thus, the outputs of all of the stages of shift register 54 are made available to control circuits 56 by way of bus 57.

The control circuits 56 respond the various codes in each message block to initiate and control the operation of the station circuit. Control circuits 56, for example, detect a synchronizing code, and also detect the loop destination code which is applied to controller 605 (FIGS. 5 and 6) as discussed hereinafter.

The output of shaft register 54 is applied to shift register 58 which is an eight-stage, serial input, serial output, shift register with both parallel reading and parallel writing facilities. Thus, write logic circuit 59, under the control of signals from control circuits 56 and signals from a local data source, via leads 60, control the serial or parallel writing of data, appearing on leads 61, into shift register 58. Similarly, read logic circuits 62, under the control of signals from control circuits 56 and signals on read control leads 63, permit the reading, in series or in parallel, of message words from shift register 58 onto data output leads 64. It can thus be seen that message blocks can be entered into and removed from the transmission loop one word at a time by way of shift register 58. This facility is particularly utilized to transfer a message block from one loop to another.

The serial output of shift register 58 is applied to data output circuit 65. In general, data output circuit 65 inserts or reinserts one-bit in guard spaces between message words.

A loop initialization circuit 66 is provided, for A-stations only, and is used to initialize the loop when message block framing is lost. In general, this is accomplished by inserting nine zeros, followed by all ones, on the loop.

The output of data output circuit 65 is applied to data transmitter 67 which may be used to modulate the data to the desired frequency range for transmission on the loop. This modulated data is transmitted by way of isolating transformer 68 and output terminals 69 to the transmission loop.

The station circuit of FIG. 4 performs all of the functions necessary for the A- or B-stations of FIG. 1. Slight modifications are required for A-station use. Clock signals, for example, may be provided from a local pulse source rather than from a timing recovery circuit 53. The read and write logic circuits 62 and 59 are not required since no data access takes place at the A-station. The loop initialization circuit 66, however, is required. Most of the balance of the circuitry of FIG. 4 can be identical in B-stations and in A-stations. Indeed, substantial manufacturing savings may be effected by constructing a single station which can be manually modified to serve as either an A-station or a B-station.

Figure 5:
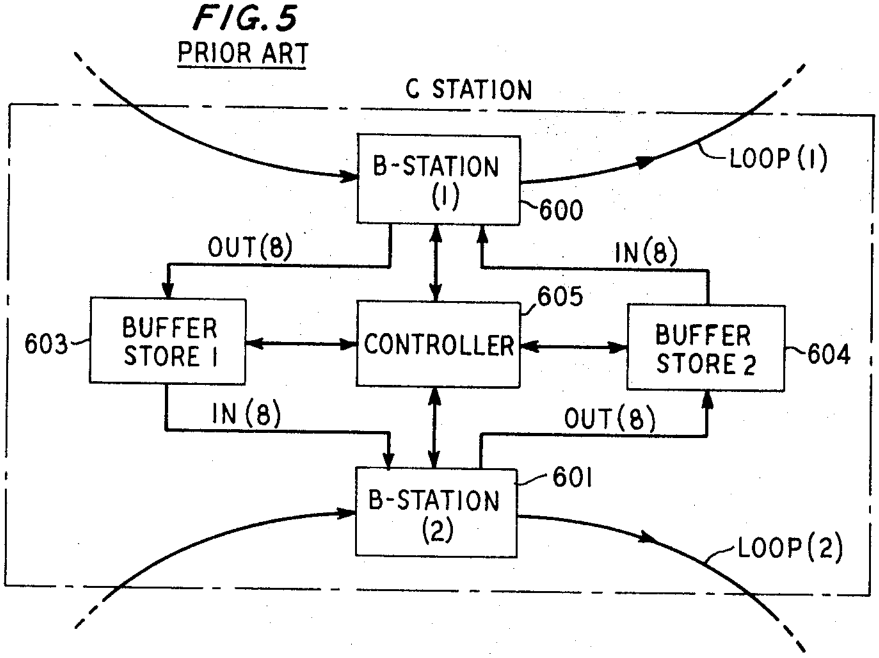
FIG. 5 PRIOR ART
FIG. 5 is a block diagram of a "C" station circuit used in the practice of this invention.

In FIG. 5 there is shown a block diagram of a C-station, suitable for use in the data transmission network of FIG. 1, which comprises two B-stations 600 and 601. Each of B-stations 600 and 601 may be a station circuit such as that previously described and shown in FIG. 4. B-station 600 is interposed in one loop (1) while B-station 601 is interposed in another loop (2). B-station 600 delivers data to a buffer store 603 which, in turn, delivers data to B-station 601. Similarly, B-station 601 delivers data to a buffer store 604 which, in turn, delivers that data to B-station 600. A controller 605 receives control signals from B-stations 600 and 601 and issues appropriate commands to buffer stores 603 and 604.

It can be seen that the C-station of FIG. 5 allows loop (1) and loop (2) to intersect in the sense that message blocks on loop (1) can be launched on to loop (2) and message blocks on loop (2) can be launched on to loop (1). This is accomplished by utilizing the Hamming distance criterion to develop control signals for transferring from one loop to another. In response to such control signals, a message block is transferred by the appropriate B-station, i.e., 600 or 601, into the respective buffer store, 603 or 604. As soon as a vacant message block is detected on the loop into which the message is to be launched, the buffer store delivers the message block to the appropriate B-station, 600 or 601, for insertion into loop (1) or loop (2).

Buffer stores 603 and 604 may comprise different portions of the same memory and may have the capacity of several message blocks. Indeed, to prevent an undue number of message blocks from being lost, the size of buffer stores 603 and 604 is selected with due regard to the amount of interloop traffic to be expected. The entry of message blocks into buffer stores 603 and 604 and the removal of these message blocks from the buffer store are under the control of controller 605.

It should be noted that B-stations 600 and 601 need not be operating at the same pulse repetition rate nor in synchronism. Data is written into the buffer stores 603 and 604 under the control of timing signals from the B-station reading the message. Data is read from the buffer stores under the control of timing signals from the B-station in the loop in which the message is to be inserted. Since both B-stations are synchronized with their associated loops, a rate change is possible between the two loops. The multimessage block capacity of the buffer stores 603 and 604 permits any desired relationship between the rates in the two loops. As previously noted, apparatus for realizing the above-described "A," "B," and "C" stations is fully described in the cited copending application of J. R. Pierce.

Figure 6:
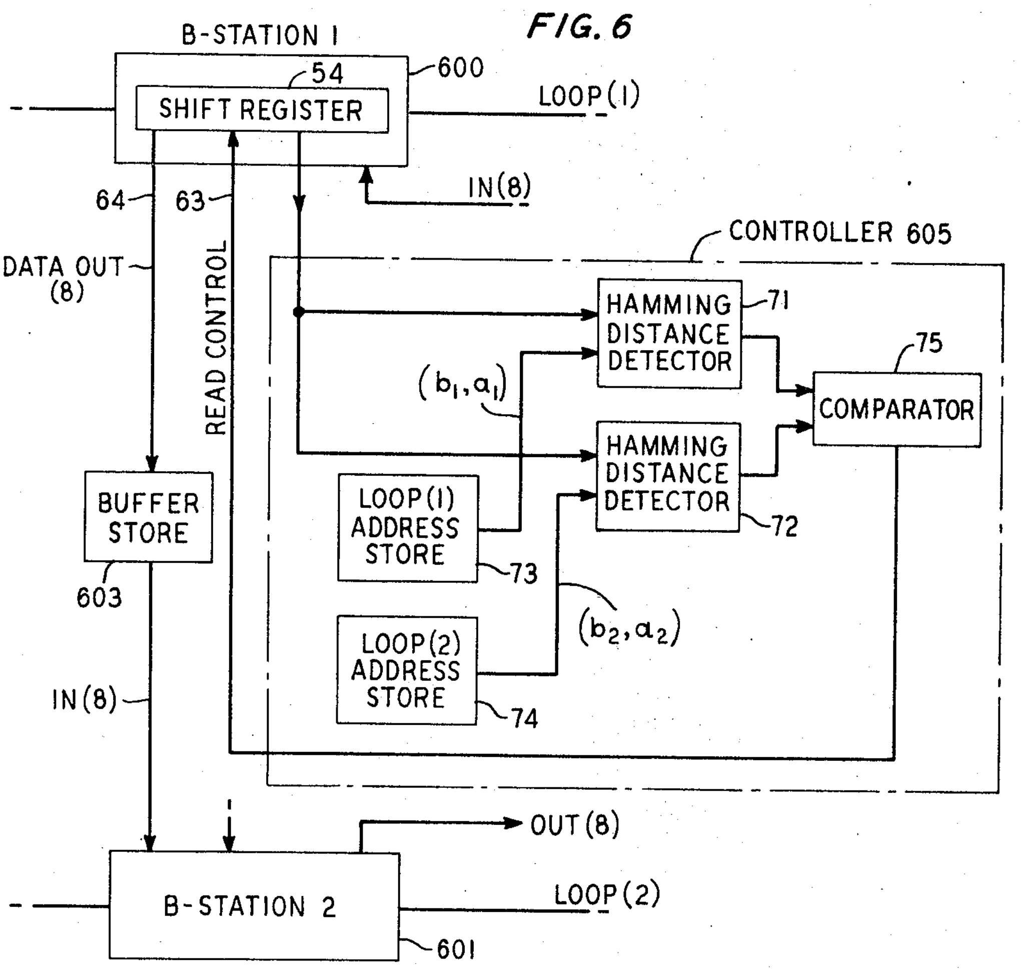
FIG. 6 is a block diagram of relevant parts of the "C" station circuit of FIG. 5.

Controller 605 also includes apparatus for determining whether a transfer should be made to an interconnecting loop and for effecting this transfer. FIG. 6 depicts a portion of the circuit of FIG. 5 to illustrate the process involved in transferring a message block from loop (1) to loop (2). Of course, an identical technique is used in transferring a message block from loop (2) to loop (1). B-station 600, includes shift register 54, as shown in FIG. 4, into which is selectively shifted the loop destination code of the message block. This code, i.e., sequence of bits, is applied simultaneously to Hamming distance detectors 71 and 72 by control circuits 56 (FIG. 4). Applied, respectively, to each detector, by address stores 73 and 74, are the concatenated address sequences $(b_1, a_1)$ and $(b_2, a_2)$ of loop (1) and loop (2) which are permanently stored in controller 605. Detector 71 develops a signal representative of the Hamming distance between the destination loop addres and the loop (1) address. Detector 72 develops a signal representative of the Hamming distance between the destination loop address and the address of loop (2). If the latter distance is less than the former distance, comparator 75 develops a control signal which is applied to B-station 600 to transfer a message block to buffer store 603.

Figure 7:
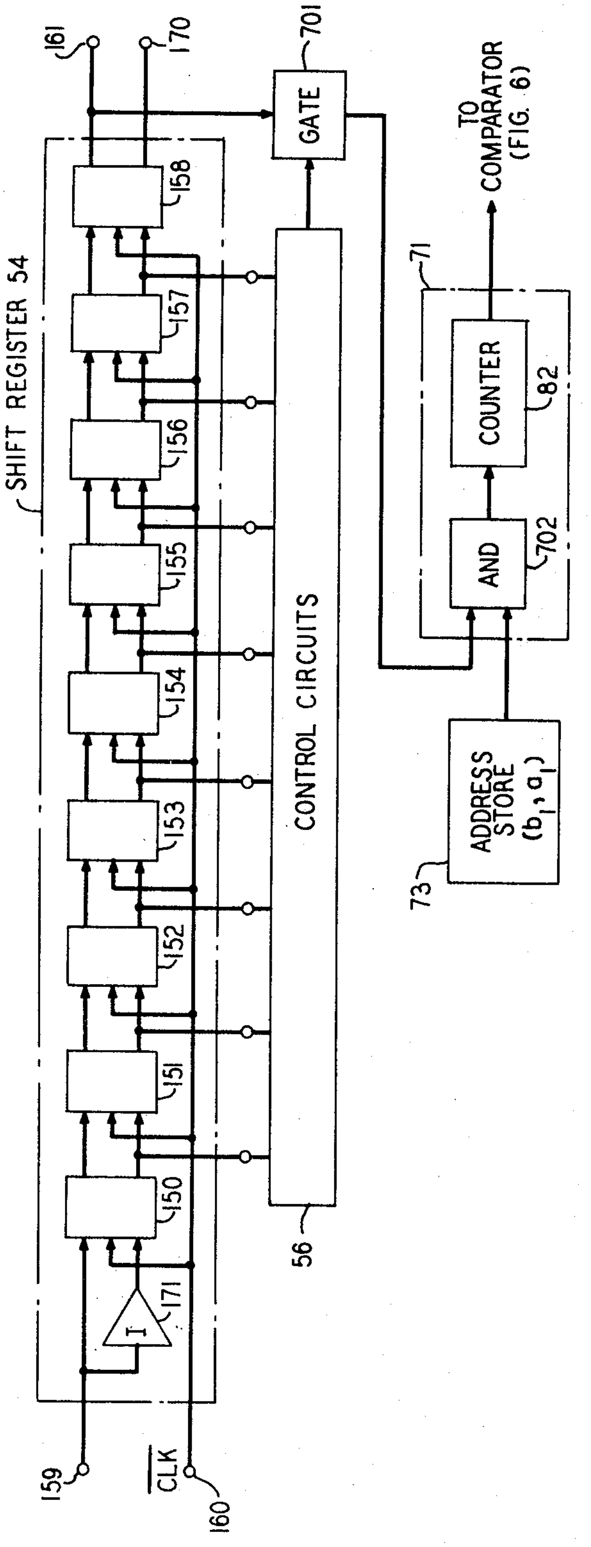
FIG. 7 is a block diagram of a shift register, Hamming distance detector, and address store used in the "C" station circuit of FIG. 6.

FIG. 7 shows in more detail shift register 54 of B-station 600 Hamming distance detector 71 and loop (1) address store 73.

Shift register 54 comprises nine binary stages, 150 through 158. Serial input data (derived from data receiver 52 in FIG. 4) appears at input terminal 159 and is applied directly to the set input of the first stage 150, and through inverter 171, to the reset input of stage 150. Inverted clock pulses (from timing recovery circuits 53 in FIG. 4) appear at terminal 160 and are applied to all of stages 150 through 158 to advance the data signals through these stages. The serial output pulses from shift register 54 appear at output terminal 161.

The individual stages 150-158 of the shift register also provide parallel output signals to output terminals 162 through 170, respectively. It is therefore apparent that data can be written into the shift register in a serial fashion from terminal 159, may be read out of shift register A in a serial fashion via terminal 161, and may be read out of shift register A in parallel by way of terminals 162 through 170. The outputs at terminals 162 through 170 are connected to control circuits 56 (FIG.

4). Illustratively, the first three words of each message block, as they pass through shift register 54, are applied in parallel to the control circuits to control the operation of the station. Upon detection of a destination loop code, control circuits 56 apply the eight encoded bits to detector 71 via gate 701. Loop (1) address store 73 which may be any well-known memory device having a serial data readout, applies the stored loop address to detector 71. Thus, if the message block is addressed to loop $i$, a first ordered concatenated binary sequence $(a_i, b_i)$ is applied via gate 701 to AND circuit 702 of Hamming detector 71. Simultaneously, a second ordered concatenated binary sequence $(b_1, a_1)$ is applied via address store 73 to AND circuit 702. AND circuit 702 performs a simple scalar product of the two applied sequences since a "1" output only occurs when a "1" is present at both inputs to circuit 702. The signals appearing at the output of circuit 702 are applied to counter 82, the output of which in turn is supplied to comparator 75 of FIG. 6. Counter 82 therefore develops a signal proportional to the total Hamming distance between loop $i$ and loop 1. Identical circuitry, not shown, is utilized to determine the Hamming distance between the destination code of the message block and the loop (2) code of store 74, as shown in FIG. 6.

Figure 8:
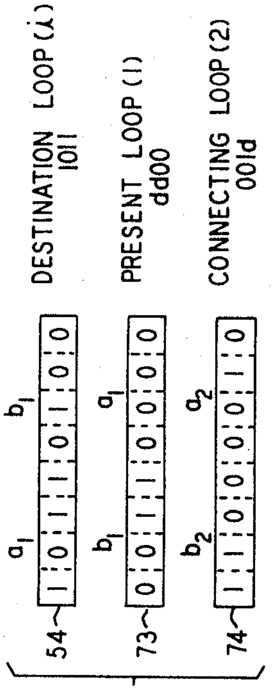
FIG. 8 depicts various loop addresses and their respective stored codes.

FIG. 8 is illustrative of the case where, in accordance with the addressing scheme of Graham and Pollak, destination loop $i$ is identified as 1011; loop (1), in which the message block is currently circulating, is identified as dd00; and the identification of connecting loop (2) is 001d. The reformulation of these addresses, in accordance with this invention, is depicted in the associated blocks which represent the contents of shift register 54 and stores 73 and 74. The scalar product of the stored codes of register 54 and store 73 is equal to two. Thus, the Hamming distance between destination loop (i) and current loop (1) is two. On the other hand, the scalar product between destinatinon loop (i) and connecting loop (2) is one. Thus, the apparatus of FIG. 6 would transfer the message block from loop (1) to loop (2) since this decreases the distance between the message and its final destination.

What is claimed is:

1. In an interconnecting loop digital transmission system, including means for transferring a message block to an interconnecting loop when the Hamming distance between an identifying three-level encoded destination loop address code of said message block and an identifying three-level encoded address code of the loop in which said message block is present will be reduced, the improvement comprising:

first means for detecting in each message block a loop destination address code comprised of a first ordered concatenation of two binary sequences;

second means for storing at each interconnecting loop transfer means an address code comprised of a second ordered concantenation of two binary sequences identifying one of said interconnecting loops;

and third means for forming the scalar product of said first and second ordered codes to determine the Hamming distance between said loop destination address code and said identifying interconnecting loop address code.

2. In an interconnecting loop digital transmission system, including means for transferring a message block to an interconnecting loop when the Hamming distance between an identifying three-level encoded destination loop address code of said message block and an identifying three-level encoded address code of the interconnecting loop in which said message block is present will be reduced, the improvement comprising:

first means for detecting in each message block a loop destination address code comprised of a first concatenation of a first and a second binary sequence;

second means for storing an address code identifying one of said interconnecting loops comprised of a second concatenation of a third and a fourth binary sequence;

and third means for forming the scalar product of said first and second ordered concatenated codes to determine the Hamming distance between said loop destination address code and said interconnecting loop address code.

3. In an interconnecting loop digital transmission system, including means for transferring a message block to an interconnecting loop, identified by a three-level encoded address code $h_k$, when the Hamming distance between an identifying three-level destination loop address code $h_i$ of said message block and an identifying three-level encoded address code $h_j$ of the interconnecting loop in which said message block is present will be reduced, the improvement comprising:

first means for detecting in each message block a loop destination address code comprised of a first ordered concatenation of a first and a second binary sequence, said first sequence having binary ones where $h_i$ has ones and binary zeros elsewhere and said second sequence having binary ones where $h_i$ has zeros and binary zeros elsewhere;

second means for storing at each interconnecting loop transfer station an address code identifying said interconnecting loop in which said message block is present comprised of a second ordered concatenation of a third and a fourth binary sequence, said third sequence having binary ones where $h_j$ has zeros and binary zeros elsewhere and said fourth sequence having binary ones where $h_j$ has ones and binary zeros elsewhere;

and third means for forming the scalar product of said first and second ordered codes to determine the Hamming distance between said loop destination address code $h_i$ and said interconnecting loop address code $h_j$.

4. The improvement defined by claim 3 further comprising:

fourth means for storing at each interconnecting loop transfer station an address code identifying said other interconnecting loop comprised of a third ordered concatenation of a fifth and a sixth binary sequence, said fifth sequence having binary ones where $h_k$ has zeros and binary zeros elsewhere and said sixth sequence having binary ones where $h_k$ has ones and binary zeros elsewhere;

and fifth means for forming the scalar product of said first and third ordered codes to determine the Hamming distance between said loop destination address code $h_i$ and said interconnecting loop address code $h_k$.

5. The improvement defined by claim 4 further comprising:

sixth means responsive to said third and fifth means for developing a transfer control signal when said scalar product of said fifth means is less than said scalar product of said third means.

6. In an interconnecting loop digital transmission system wherein the destination loop of a message block is identified by a three-level encoded address code $h_i$, the loop in which said message block is present is identified by a three-level encoded address code $h_j$, and a loop interconnecting with said loop $h_j$ is identified by a three-level encoded address code $h_k$, said codes $h_i$, $h_j$ and $h_k$, assigned in accordance with a Hamming distance criterion, the improvement comprising:

means for appending to each message block a first ordered concatenation of a first and second binary sequence, said first sequence having binary ones where $h_i$ has ones and binary zeros elsewhere, said second sequence having binary ones where $h_i$ has zeros and binary zeros elsewhere;

means for storing at each loop interconnection second and third ordered concatenations of binary sequences representing, respectively, said interconnecting loop addresses $h_j$ and $h_k$, said second ordered concatenation comprising third and fourth binary sequences, said third sequence having binary ones where $h_j$ has zeros and binary zeros elsewhere, said fourth sequence having binary ones where $h_j$ has ones and binary zeros elsewhere, said third ordered concatenation comprising fifth and sixth binary sequences, said fifth sequence having binary ones where $h_k$ has zeros and binary zeros elsewhere, said sixth sequence having binary ones where $h_k$ has ones and binary zeros elsewhere;

means forming first and second scalar products, respectively, of said first and second ordered concatenations and said first and third ordered concatenations;

and means for transferring said message block to said interconnecting loop when said second scalar product is less than said first scalar product.

7. In an interconnecting loop digital transmission system wherein the destination loop of a message block is identified by a three-level encoded address code $h_i$, and two interconnecting loops are identified by three-level encoded address codes $h_j$ and $h_k$, said codes $h_i$, $h_j$ and $h_k$ assigned in accordance with a Hamming distance criterion, the improved method comprising the steps of:

associating with each message block a first loop destination address code comprised of a first ordered concatenation $(a_i, b_i)$ of two binary sequences derived from $h_i$;

storing at each loop interconnection a second address code comprised of a second ordered concatenation $(b_j, a_j)$ of two binary sequences derived from $h_j$;

and forming the product of said first and second address codes to determine the Hamming distance between said codes $h_i$ and $h_j$.

8. The method of claim 7 further comprising the steps of:

storing at each loop interconnection a third address code comprised of a third ordered concatenation $(b_k, a_k)$ of two binary sequences derived from $h_k$; and forming the product of said first and third address codes to determine the Hamming distance between said codes $h_i$ and $h_k$.

9. The method of claim 8 wherein $a_i$ has ones where $h_i$ has ones and zeros elsewhere, $b_i$ has ones where $h_i$ has zeros and zeros elsewhere, $b_j$ has ones where $h_j$ has zeros and zeros elsewhere and $a_j$ has ones where $h_j$ has ones and zeros elsewhere, $b_k$ has ones where $h_k$ has zeros and zeros elsewhere and $a_k$ has ones where $h_k$ has ones and zeros elsewhere.

10. In an interconnecting loop digital transmission system wherein the destination loop of a message block is identified by a three-level encoded address code $h_i$, the loop in which said message block is present is identified by a three-level encoded address code $h_j$, and a loop interconnecting with said loop $_j$ is identified by a three-level encoded address code $h_k$, said codes $h_i$, $h_j$, and $h_k$, assigned in accordance with a Hamming distance criterion and said three-level code comprising the characters 0, 1, and a third arbitrary character, the improved method comprising the steps of:

appending to said message block a first ordered concatenation of a first and second binary sequence, said first sequence having binary ones where $h_i$ has ones and binary zeros elsewhere, said second sequence having binary ones where $h_i$ has zeros and binary zeros elsewhere;

storing at said loop interconnection second and third ordered concatenations of binary sequences representing, respectively, said interconnecting loop addresses $h_j$ and $h_k$, said second ordered concatenation comprising third and fourth binary sequences, said third sequence having binary ones where $h_j$ has zeros and binary zeros elsewhere, said fourth sequence having binary ones where $h_j$ has ones and binary zeros elsewhere, said third ordered concatenation comprising fifth and sixth binary sequences, said fifth sequence having binary ones where $h_k$ has zeros and binary zeros elsewhere, said sixth sequence having binary ones where $h_k$ has ones and binary zeros elsewhere;

forming first and second scalar products, respectively, of said first and second ordered concatenations and said first and third ordered concatenations;

and transferring said message block to said interconnecting loop when said second scalar product is less than said first scalar product.

* * * * *